United States Patent [19]

Barnes et al.

[11] Patent Number: 4,860,833
[45] Date of Patent: * Aug. 29, 1989

[54] DRAFT CONNECTION

[75] Inventors: Billy R. Barnes, Lamesa; Ronny L. Barnes; David A. Gary, both of O'Donnell, all of Tex.

[73] Assignee: Bar-Gar Corporation, O Donnell, Tex.

[*] Notice: The portion of the term of this patent subsequent to Apr. 7, 2004 has been disclaimed.

[21] Appl. No.: 925,162

[22] Filed: Oct. 31, 1986

Related U.S. Application Data

[63] Continuation-in-part of Ser. No. 754,619, Jul. 12, 1985.

[51] Int. Cl.$^4$ .............. A01B 69/00; A01B 51/00; A01B 59/043; A01B 59/00
[52] U.S. Cl. .................................. 172/26; 172/191; 172/272; 172/443; 172/450; 172/677
[58] Field of Search .......... 280/456 A, 460 A, 461 A; 172/272, 311, 439, 443, 451, 280, 450

[56] References Cited

U.S. PATENT DOCUMENTS

| | | | |
|---|---|---|---|
| 1,328,335 | 1/1920 | Nilson | 280/456 A |
| 2,626,547 | 1/1953 | Starr | 280/460 A |
| 2,653,823 | 9/1953 | Wilson | 280/456 A |
| 2,691,932 | 10/1954 | Sawyer et al. | 280/460 A |
| 2,782,704 | 2/1957 | Jackson | 172/272 |
| 3,065,977 | 11/1962 | Virtue et al. | 280/460 A |
| 3,572,759 | 3/1971 | Baugh | 172/272 |
| 3,680,648 | 8/1972 | Tonsfeldt | 172/311 |
| 3,935,696 | 2/1976 | Pavel | 172/311 |
| 4,015,855 | 4/1977 | Murray | 280/461 A |
| 4,216,975 | 8/1980 | Schafer | 280/461 A |
| 4,655,295 | 4/1987 | Barnes et al. | 172/26 |

Primary Examiner—Robert A. Hafer
Assistant Examiner—Michael Brown
Attorney, Agent, or Firm—Wendell Coffee

[57] ABSTRACT

Stabilizng arms are applied to an agricultural tractor having a three point hitch with a quick hitch frame. Specifically, a belly plate is added to the frame beams about half way between the front axle and the rear axle. A horizontal frame draw bar extends from the belly plate to a pivot pin mounted by a clamp below the rear axle housing. The stabilizing arms extend from the pivot pin below the axle housing back to a quick hitch frame pin, which is an extension of the quick hitch pin and extends outboard of the quick hitch frame on each side thereof. A cross brace extends between the stabilizing arms to form a rigid stabilizing frame. Because the pivot pin below the axle is not coaxial with the pin by which the normal draft links are connected to the differential housing of the tractor, it is necessary that the stabilizing arms be pivoted so that the quick hitch frame can be mounted to have its normal motion to raise and lower the tillage implements connected to the quick hitch frame.

6 Claims, 4 Drawing Sheets

DRAFT CONNECTION

CROSS REFERENCE TO RELATED APPLICATIONS

This is a continuation-in-part of the prior patent application entitled, TRACTOR STABILIZER, Ser. No. 754,619, filed July 12, 1985. All of the inventors of that application are also coinventors of this application and the ownership among them is the same for both applications.

RIGHTS TO INVENTIONS UNDER FEDERAL RESEARCH:

There was no federally sponsored research and development concerning this invention.

BACKGROUND OF THE INVENTION

1. Field of the Invention

This invention relates to earth working and more particularly to agricultural tillage.

Farmers have ordinary skill in the art to which this invention relates.

2. Description of the Related Art

For many years, farm tractors have been used to draft tillage equipment and particularly heavy tillage equipment through the fields. By heavy tillage equipment, is meant tillage equipment that tills the soil deeply, for example over three inches. Besides turning plows and rippers, listers are a common type of such equipment.

Because of agricultural developments in the United States and the increased labor costs, extremely large tractors are used so that one farmer may till large areas of land. As used herein, large tractors mean tractors having over 100 horse power. At a time when the labor costs are less, it was economically feasible to use smaller tractors. Now the use of smaller tractors is prohibitively expensive because each tractor requires a human operator. Therefore, for many years, the trend in United States agriculture has been to use larger and larger tractors. The tool bars are long and equipped with gauge wheels. A wide strip or swath of ground is tilled with each pass of the tractor.

Typically, these large tractors have large low pressure pneumatic tires. As the power of the tractor increases, it is necessary to increase the weights for sufficient traction upon the soil to draft the heavy tillage implements through the earth. To prevent undue compaction of the ground under the wheels, extremely large tires with low air pressure are used to distribute the weight of the tractor over a larger area.

However large tires with low air pressure results in lack of lateral stability. The frame of the tractor tends to move back and forth laterally even though the tread of the tires follow the earth faithfully. The tires themselves permit the wheels and thus the frame to move laterally.

Farmers have always had difficulty plowing straight furrows. Surface indentation, rocks, clods, clumps of weeds, grasses and roots, steering corrections, and other causes of lateral shifts, jumps, jerks, and wiggles of the implement seem uncorrectable with prior art equipment. In fact, lateral sway was designed into the hitch (Morling, pages 7 and 11). (Roy W. Morling, *Agricultural Tractor Hitches Analysis of Design Requirements*, No. 5, Dec. 12, 1979, published by ASAE, P.O. Box 410, St. Joseph, MI 49085) The soft tires tend to aggravate the problem. Also, with long tool bars, plows on one end maybe plowing in hard soil while plows on the other end are plowing in soft soil.

It has long been known in the design of draft vehicles, such as farm tractors, that the equipment might be drafted from the frame of the tractor forward of the rear axles. Examples of such drafting apparatus include the French patent to GUILLOTTE, U.S. Pat. No. 1,098,133, "publie" July 18, 1955 or the U.S. Pat. No. to SILVER ET AL, 2,713,295. Also, see page 4 of Morling. Although the drafting from this position seems advantageous, applicants have difficulty explaining why this advantageous result came about. The only publication they found that seemed to discuss the problem was Morling and the publication by Gill and Berg, "Soil Dynamics in Tillage and Traction" by William R. Gill and Glen E. Vanden Berg, a publication of the Agricultural Research Service of the United States Department of Agriculture, United States Printing Office, 1967.

Gill and Berg indicates at page 340 the efficiency of power transmission from the rear axle through the tires into tilled or agricultural soil is perhaps no better than 50 percent as applicants understand the discussion).

About 1950, the great advantages of three point hitches were commercially recognized. Three point hitches are shown in the U.S. Pat. Nos. issued to DOSS, 4,142,588, Mar. 6, 1979; ALTGELT, 2,637,262, May 5, 1953; and ANDERSON, 2,797,627, July 2, 1957, for example. These three point hitches have the great advantage of providing quick attachment and detachment of implements to farm tractors. The three point hitch made it possible for one man to quickly detach one implement and attach another. Also, see page 6 of Morling. Because of the great advantages of the three point hitch, tractor manufacturers quit manufacturing tractors with equipment drafted from the frame forward of the rear axle. Many three point hitches include force sensing and load control features. Morling concludes that these features are not economically beneficial for large tractors (pages 17, 18, and 27). Energy losses are explained on page 18.

In recent years, quick couplers or quick hitch frames have become widely used. (Morling, page 21) The quick hitch frame is a yoke or frame which is attached to the ends of the three links of the three point hitch. The rear of the yoke or frame contains hooks which may readily be hooked onto horizontal bolts or pins by which the agricultural implement would otherwise be hooked to the distal points of the three links.

The rear three point hitch tends to lift the front of the tractor off the ground during certain conditions. It was often sought to correct this problem by use of counterweights at the front of the tractor.

The following patents are of record in the parent application (some are discussed above).

| United States Patents | |
|---|---|
| MCCALL | 984,581 |
| PLUM | 1,608,666 |
| HESTER | 2,019,854 |
| THEIS | 2,197,670 |
| WATSON | 2,496,760 |
| ALTGELT | 2,637,262 |
| SILVER ET AL | 2,713,295 |
| RUDIO | 2,752,838 |
| ANDERSON | 2,797,627 |
| NEEDHAM | 3,021,621 |
| STEFFE | 3,601,202 |
| CAPEHART | 3,840,076 |

-continued

| | |
|---|---|
| QUANBECK | 4,068,723 |
| BUCK ET AL | 4,069,874 |
| LARSON | 4,117,889 |
| DOSS | 4,142,588 |
| WILLIAMS | 4,331,345 |
| French Patent | |
| GUILLOTTE | 1,098,133 |

These patents are considered pertinent because the applicant believes the Examiner would consider anything relevant or pertinent to the parent application to be relevant and pertinent to the examination of this application.

SUMMARY OF THE INVENTION

(1) Progressive Contribution to the Art

We have discovered that, if the prior method of drafting forward of the rear wheels from under the frame of the tractor is combined with the three point hitch, according to our invention many advantages result.

First, applicants find that the lateral shifting of the tractor and tillage implement is eliminated or at least greatly reduced, I.e., straight rows are plowed.

Second, applicants find that the drafting capabilities of the tractor are greatly improved with less tire slippage. The tractor engine does not surge.

Third, there is better weight distribution between the front and rear wheels. The plow depth is constant.

Fourth, the convenience of the quick implement change and the control obtained by the three point hitch is retained.

Applicants understand why the advantages of the three point hitch are retained. This is because basically the three point hitch is retained so that equipment may be quickly attached and detached. Also, with the retention of the three point hitch, the adjustment of the top link of the three point or three link hitch is retained so that the attitude or level of the plow is retained. The inventors understand this.

Applicants have difficulty explaining why the tractor is able to draft more efficiently. Experienced farmers can readily determine by fuel consumption and by the "labor" of the engine whether the tractor is operating more or less efficiently. Empirical results from using embodiments of the invention has shown that a tractor, which previously with the regular three point hitch had difficulty with drafting a particular plow in a particular situation, was able to pull the same plow much easier (more efficiently) with the draft connection of this invention.

Applicants have measured a fuel consumption improvement of at least 30% and a time saving of about 16% of their invention over the commercial three point hitch they previously used.

As stated above, applicants know that these desirable results occur and have found certain limitations that limit their occurrence. As stated before, the publication by Gill and Berg on page 416 indicates that the "Vehicle Morphology", has an effect but to analyze why the change in the "vehicle morphology" effects the efficiency is extremely complex.

Basically, our design is characterized by the three point hitch combined with the connection forward of the rear wheels by having the draft arms connected as a stabilizing frame which extends rearwardly from below the rear axles to connect to a quick hitch frame, which is connected by a conventional three link connection.

The draft arms have a short chain link between the rear end of the draft link and the quick hitch frame, so that the axis of the draft link actually is below the bolt to which the chain link attaches to the quick hitch frame.

The connections, as described, result in an extremely rigid connection between the plows and the tractor. Wherein the prior art taught that there should be some sway and lateral movement as well as vertical movements, it is the teaching of this application that while plowing, the plows should be fixed to the tractor in one rigid position and that all possible motion, flexibility, or movement between the tractor and the plow be eliminated.

(2) Objects of this Invention

An object of this invention is to till agricultural fields.

Further objects are to achieve the above with a device that is sturdy, compact, durable, lightweight, simple, safe, efficient, versatile, ecologically compatible, energy conserving, and reliable, yet inexpensive and easy to manufacture, install, adjust, operate and maintain.

Other objects are to achieve the above with a method that is versatile, ecologically compatible, energy conserving, rapid, efficient, and inexpensive, and does not require skilled people to install, adjust, operate, and maintain.

The specific nature of the invention, as well as other objects, uses, and advantages thereof, will clearly appear from the following description and from the accompanying drawing, the different views of which are not scale drawings.

As an aid to correlating the terms describing this invention to the exemplary drawing the following catalog of elements is provided.

| Catalog of Elements | |
|---|---|
| 10 | frame |
| 11 | frame beams |
| 12 | engine |
| 14 | front wheels |
| 15 | front axle |
| 16 | rear wheels |
| 17 | transmission means |
| 18 | rear axle |
| 20 | axle housing |
| 22 | differential housing |
| 23 | transmission housing |

-continued

Catalog of Elements

| | | |
|---|---|---|
| 24 | tillage or earth working implement | |
| 25 | plow | |
| 26 | tires | |
| 28 | lift draw arm or draft link | |
| 29 | pins | |
| 30 | distal end | |
| 32 | top arm or link | |
| 34 | top distal end | |
| 36 | yoke | |
| 38 | pin or shaft | |
| 40 | draft hooks | |
| 41 | top hook | |
| 42 | implement pins | |
| 44 | lift arms | |
| 46 | lift shaft | |
| 48 | lift connecting rod | Old |
| 50 | draw pins | New |
| 52 | stabilizer draw arm or auxiliary draw link | |
| 54 | connection | |
| 56 | axle clamp | |
| 58 | belly plates | |
| 62 | frame draw arm or pitman | |
| 64 | belly pin | |
| 66 | key | |
| 68 | pivot | |
| 70 | chain link | |
| 72 | bushing | |
| 73 | long link | |
| 74 | bushing | |
| 76 | pivot bolt | |
| 78 | gusset | |
| 80 | cross brace | |
| 82 | gauge wheels | |
| 84 | arm | |
| 86 | depth control | |

Figure 1:
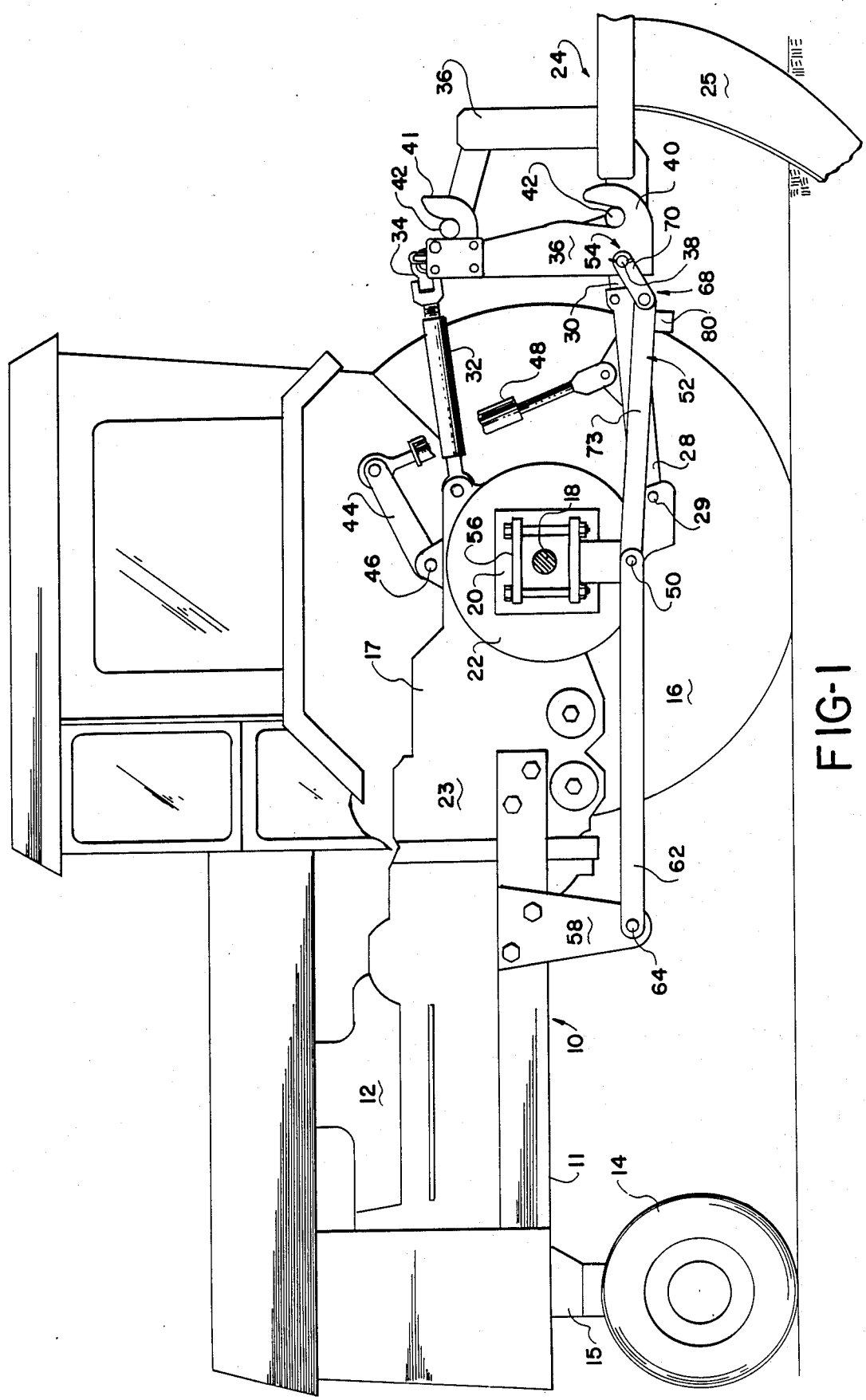
FIG. 1 is a side elevational view of a farm tractor with an embodiment of the invention. Parts have been broken away and one wheel removed for clarity.

DESCRIPTION OF THE PREFERRED EMBODIMENT:

Referring to the drawings, there may be seen a typical agricultural tractor. Basically, the tractor will include a frame 10 having spaced apart frame beams 11 upon, which is mounted engine 12. (FIGS. 1 and 2) The tractor is guided by turning front wheels 14 mounted upon front axle 15. The engine is connected through transmission means 17 to rear wheels 16 which are mounted upon axle 18 in axle housing 20. The axle housing is rigidly attached to the differential housing 22. The differential housing is rigidly attached to the transmission housing 23. The frame beams 11 are parallel and extend from the front axle 15 to the transmission housing 23. The frame beams 11 are parallel to the tractor axis or direction of draft. The entire frame includes not only the beams 11 but also the transmission housing 23, differential housing 22, and rear axle housing 20. The front axles 15 and rear axles 18 might also be considered part of the frame 10.

Although the frame beams 11 of the tractor are heavy beams, analysis of the stresses which are imposed upon the frame 10 will show that the frame has a certain amount of flexibility. This flexibility or strain is measured in fractions of inches. The extreme forces or stress of the engine 12 drafting tillage implement 24 with plows 25 will result in measurable strain in the frame 10 and frame beams 11. There will be some vibration in the frame.

As discussed before, the rear wheels normally have large low pressure pneumatic tires 26 mounted upon them.

The normal three point hitch includes two lift draw arms or draft links 28, each of which is pivoted by pins 29 to the lower portion of the differential housing 22 and extends rearwardly and outwardly to a distal end 30. It will be noted that the draw lift links are pivoted to the differential housing 22 by horizontal pins 29 which are in about fore and aft alignment with the outside of the frame beams 11. In this application, the distal end 30 of each of the lift links 28 will be at the same level as the other and spaced apart. Top arm or link 32 extends from the center of the upper portion of the differential housing rearwardly and terminates at top distal end 34.

Quick hitch yokes 36 are commercially available on the market and widely used. The yoke 36 includes a rectangular frame with a connection at the top for the top distal end 34 and two connections for the distal ends 30 of the lift draw links 28. These connections of the distal ends are normally by the use of pin 38. The quick hitch yoke 36 will usually be in a vertical plane traverse the direction of draft.

The rear of the yoke 36 has two upward open draft hooks 40 immediately behind the distal end 30 of the lift draw arm. Top hook 41 is immediately behind the top distal end 34. Therefore, the tillage implement 24 with earth working plows 25 can readily be connected into these hooks 40 and 41, inasmuch as the implement has correlating implement pins 42 which are designed and placed to mate with the hooks 40 and 41.

Two lift arms 44 are mounted upon the upper portion of the differential housing 22. They are pivoted by lift shaft 46 which is connected to a mechanism within the differential housing 22. It will be noted that the lift arms 44 are attached to the lift shaft 46 in approximate alignment with the outside surfaces of the frame beams 11. Lift connecting rod 48 connects the end of each lift arm 44 to one of the lift draw links 28 near, but spaced forward of, its distal end 30. Therefore, it can be seen that by raising or lowering the lift arm 44, the lift draft links, and therefore, the quick hitch yoke 36 is raised and lowered, as is the tillage implement 24 with the plows 25 connected thereto. The lift arms 44 sometimes have exterior hydraulic cylinders attached to them. Also, often there is an optional automatic load and depth control connected to the lift arms 44. (See Morling)

As explained above, the structure defined to this point is well known and commercially available on the market. Tractors with equipment like this have been widely sold in the United States.

According to our invention, axle draw pins 50 are connected under the axle housing 20 outboard of the point of connection of the lift draw links 28. The distance from the center of the tractor to each axle draw pin 50 is about the same as, or a little more than, the distance from the center of the yoke to each of the distal ends 30. The distance from the connection of the draft links 28 at their connection pins 29 to the differential 22 to the draw pins 50 is about the same as the distance between the pins 29 themselves. I.e., the distance from one draw pin 50 to the other opposite draw pin 50 is about three times the distance between the pins 29. Stated otherwise, the distance between the draw pins 50 is about three times the length of the lift shaft 46.

Figure 3:
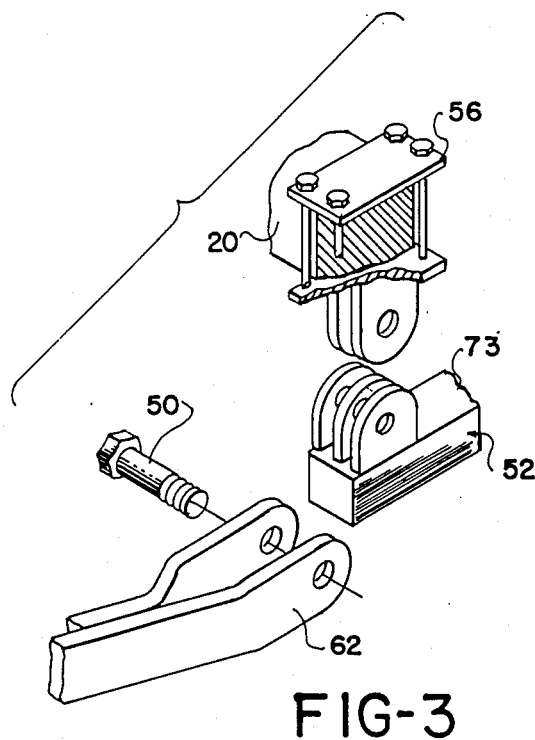
FIG. 3 is an exploded perspective view of the axle clamp and pivot beneath the axle.
Figure 4:
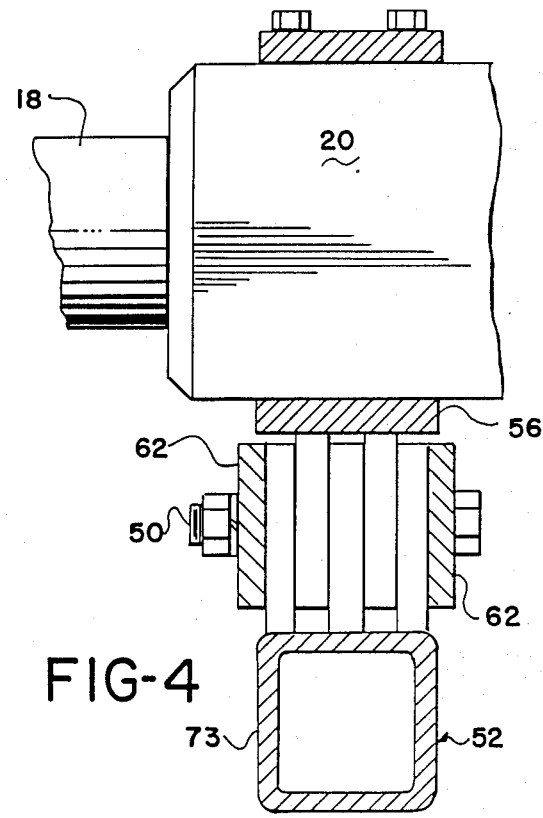
FIG. 4 is a front sectional view of the axle clamp.

Stabilizing or auxiliary draw arm or link 52 extends from the draw pin 50 to the yoke 36 at connection 54 on the yoke. The connection 54 will be described in detail later, but it is immediately adjacent and outboard of the connection of the distal end 30. Therefore, the stabilizing draw arm 52 is about parallel to the direction of draft. The draw pins 50 are through axle clamps 56 which are clamped one to each end of the axle housing 20 (FIGS. 3 and 4). The draw pins are normal to the direction of draft and parallel to the axle rear 18.

Belly plates 58 depend from the frame 10 of the tractor forward of the rear axle. Specifically, they depend from frame beams 11. The belly plates will be attached to the beams 11 preferably by bolting to the outside surface thereof. The belly plates will be located about one-half the way between the front axle 15 and rear axle 18. I.e., the distance from the belly plate on the frame beam to the rear axle 18 is within about 10% or 20% of the midpoint between the front axle and the rear axle. For example, in one instance the distance from front axle to rear axle is 114″ and the distance from the rear axle to the belly plate is 62″.

Frame draw arm 62 extends from belly pin 64 in the belly plate 58 to axle or draw pin 50, which is mounted on axle clamp 56 below the axle housing 20. Inasmuch as both the frame draw arm or pitman 62 and the stabilizer draw arm or auxiliary draw link 52 are connected to the draw pin 50 mounted on the axle clamp 56 below the axle housing 20, there is a minimal amount of stress upon the axle housing 20. As explained before, although the parts of the tractor are heavy steel parts, yet, there will be a certain amount of flexibility to them. Also there will be some tolerance in the holes in the ear of clamp 56. Therefore, the draft from the belly plate 58 to the yoke connection 54 will be from the belly plate 58 and not from the axle housing 20.

When the tillage implement 24 is raised and lowered, the stabilizing draw arms 52 will pivot about the draw pins 50 and the draw pins 50 will provide a certain amount of stabilization through the axle housing 20. However, the main stresses transmitted to the tillage implement through the quick hitch yoke 36 are from the belly plates.

It appears that the belly pin 54 must never be lower than the axle pin 50. The frame draw arm 62 should be level for best operation. Satisfactory operation may be had with pin 64 higher than axle pin 50.

Figure 6:
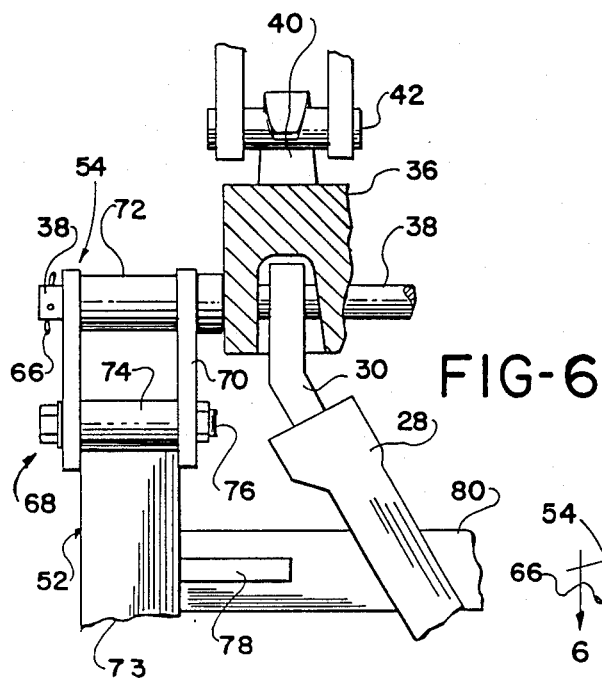
FIG. 6 is a top sectional view of the draft connection pin area of the quick hitch frame taken substantially on line 6—6 of FIG. 5.
Figure 5:
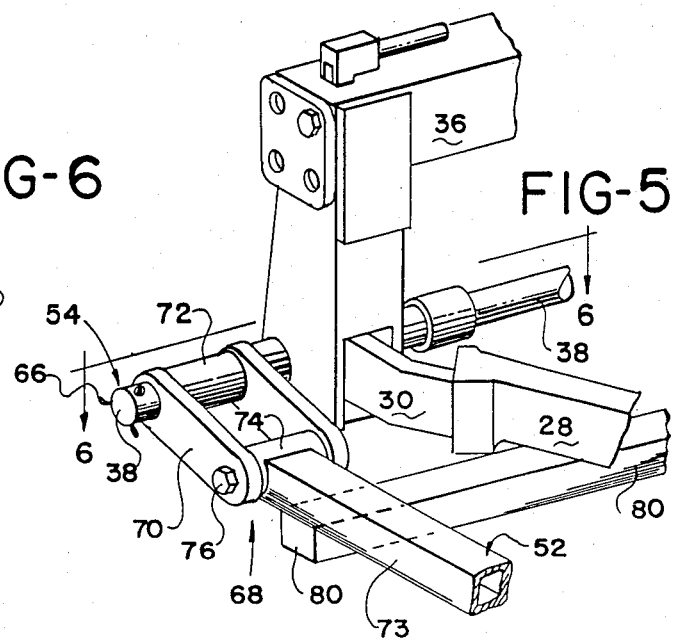
FIG. 5 is a perspective view of the connection of the draft links to the quick hitch frame.
Figure 7:
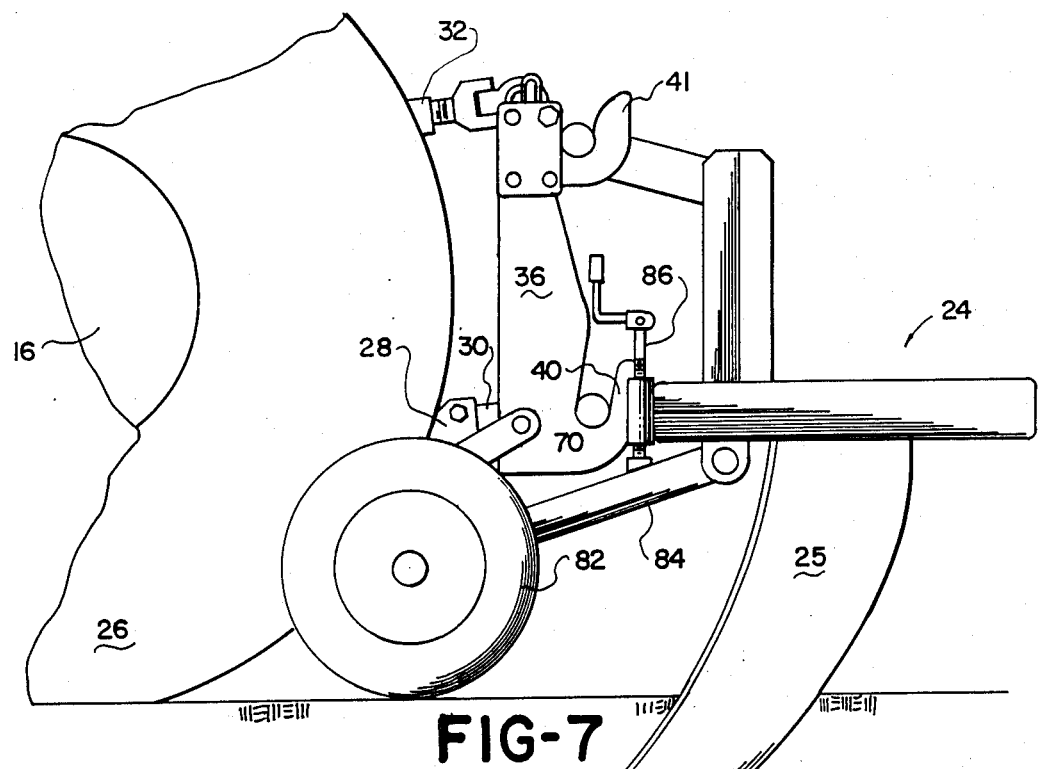
FIG. 7 is a side elevational view of a tractor with a hitch according to this invention with gauge wheels upon the plow.
Figure 8:
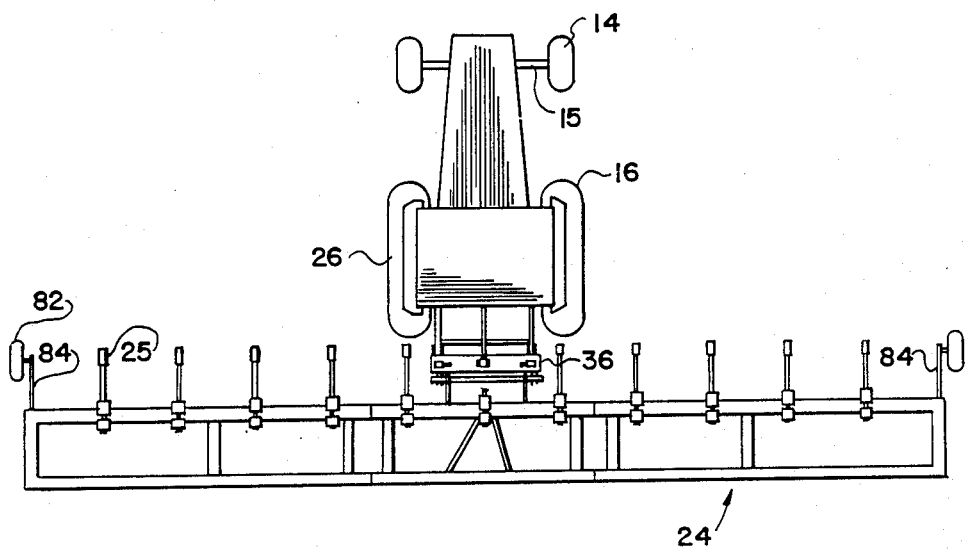
FIG. 8 is a top plan view of the tractor plow and gauge wheels as seen in FIG. 7.

It will be noted from the drawings that the lift draw arm or draft link 28 is attached to the differential housing 22 by pin 29 which is located to the rear and below the draw pin 50. The distal end 30 of the draw link 28 is connected by the pin or shaft 38 which extends from outboard of the yoke 36 on each end. The shaft 38 is loose and rotatable in the yoke 36. The end of the stabilizer arm or auxiliary draw link 52 connects to the shaft pin 38 outboard of the yoke 36. The shaft is held in place by pin or cotter or key 66. The stress on shaft 38 will cause it to bow forward between the distal ends 30. It will be noted in FIGS. 2 and 6 that the draft links 28 angle and pull inward at the yoke 36.

Analysis will show since pivot points of the two links 28 and 52 are not coaxial, there must be a change in the length of the stabilizer arm or auxiliary draw link 52. The draw link 52 includes long link 73 pivoted at 68 to chain link 70. The preferred structure utilizes a short chain link 70. The short chain link 70 has bushing 72 at one end which telescopes over the shaft 38 outboard of the yoke 36. The distal end of the long link 73 of the stabilizer arm 52 has bushing 74. Bolt 76 forms the pivot 68 between the chain link 70 and the long link 73 and extends through the busing 74. Applicants understand there appears to be no limit as to the length of the chain link 70. I.e., it could be longer so that the pivot bolt 76 could be a half way of the length of the stabilizer draw arm 52.

Cross brace 80 is connected between the stabilizer draw arms 52. This cross brace forms a rigid stabilizer frame for the stabilizer draw arms 52. As illustrated, the cross brace 80 is near the connection 54 to the quick hitch frame. The cross brace 80 has great stress upon it. In experimental use, the cross brace 80 has broken loose from the long link 73. Therefore, gussets 78 between the link 73 and brace 80 are required.

For satisfactory operation, applicants have found that the automatic load and depth control must be off, i.e., not working. Also, best results are obtained if the pivot bolt 76 is lower than shaft 38. It appears best results occur with the chain link 70 having an angle of about 150° from the long link 73. This results in the axis of the pivot bolt 76 about 5 inches lower than the axis of the shaft 38.

Figure 2:
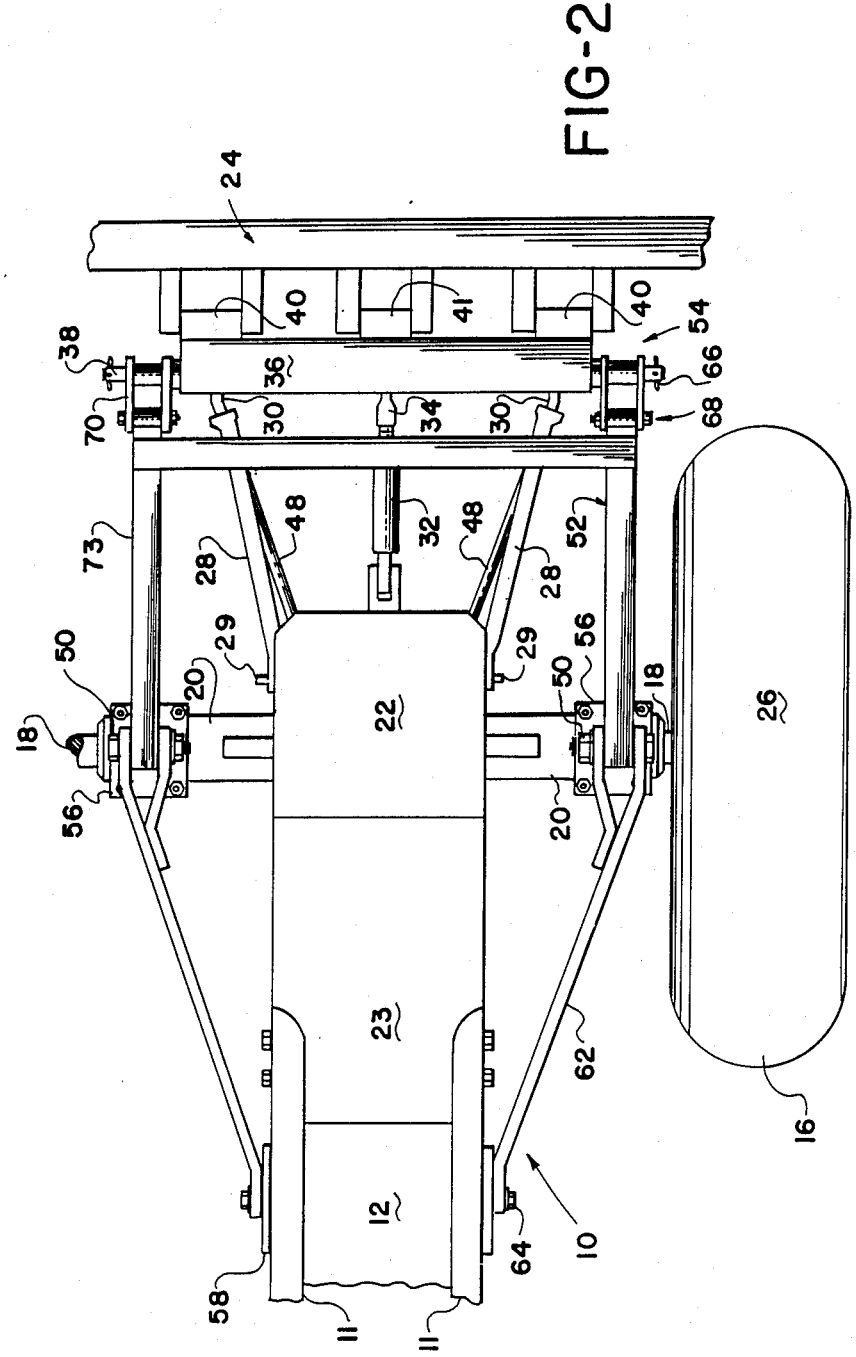
FIG. 2 is bottom plan view of the rear of the tractor showing the invention.

Particularly referring to FIG. 2, analysis will show that there is almost a triangular structure formed by the axle housing 20, the arm 28, and the arm 52. This triangular structure prohibits any lateral movement of the tillage implement 24. Also, the connections prohibit any vertical movement of the plow if there are any stresses on the plow except those that are aligned at the center of the plow and parallel to the direction of draft. It appears that if there is any swaying force applied to the tillage implement, such as a particular large force applied because of hard dirt at one end of the tillage implement, that this would tend to produce a certain lateral movement. Applicants submit that this force tending to produce lateral movement upon the chain links 50 will lock the pivots at 68 and at 54 so that the chain link 70 is rigidly connected to the long link 73.

It will be understood, when the chain link 50 is locked to the long link 73 and the other pivots are locked, the normal analysis of the system as having pivots is no longer valid. The joints under lateral force are bound as though they were rigid, welded connections. Therefore, members which are normally considered to be in tension may in fact be in compression, whereas normal analysis would show some members to be in compression they would be in tension. Also, if gauge wheels are used with the plows, this results in different applications on the tractor hitch. For example, the top link 32 is observed to have no stress, either tension or compression upon it when the plow is working. However, even though the top member 32 has no tension, the connection of the plow to the tractor is rigid. Applicants have observed with this rigid connection that there is no surging of the engine of the tractor, but it pulls smoothly and evenly. Likewise, the plows remain at a constant depth so that the land is tilled evenly. Also, there is no side sway to the implement or the tractor. Although the tractor rear wheels are large low pressure tires which have little lateral resistance to movement, it appears with this rigid connection between the plow and the tractor that the tractor has little or no lateral movement.

The cross brace 80 between the long link 73 will prevent one end of the implement from rising vertically with respect to the other end. Stated otherwise, the cross brace 80 will prevent rotation around an axis parallel to the direction of draft. The prevention of any rotation as between the implement and the tractor about an axis parallel to the direction of draft could also be analyzed that considering the tillage implement 24 as the point of reference, each of the rear wheels 16 of the tractor is prohibited from dropping lower than the other rear wheel. It will be understood that normally in soft dirt, drive wheels will tend to bury downward and dig a hole. However, as stated before, if the tillage implement 24 is considered to be the point of reference, then neither of the tractor wheels 16 can dig down and bury up because of the rigidity introduced by the cross brace 80.

Further as illustrated, the tillage implement 24 will have a width of about at least three times the width of the tractor as measured across the wheels 16. Therefore, for proper depth control, it is necessary that gauge wheels 82 be attached to the tillage implement 24 at each end thereof. The gauge wheels 82 will be attached to the tillage implement 24 by arms 84 and depth control device 86 as is well known.

If uneven ground is encountered as for example, near terraces, it is necessary that the tillage implement 24 be hinged at a point about behind the wheel 16 so that the wings may float independent of the center section. Such floating wings are known to tillage implements used with large tractors. In the event that hinged tool bars or tillage implements are employed, additional gauge wheels may be used.

The embodiment shown and described above is only exemplary. we do not claim to have invented all the parts, elements, or steps described. Various modifications can be made in the construction, material, arrangement, and operation, and still be within the scope of our invention.

The restrictive description and drawing of the specific example above do not point out what an infringement of this patent would be, but are to enable one skilled in the art to make and use the invention. The limits of the invention and the bounds of the patent protection are measured by and defined in the following claims.

We claim as our invention:
1. Agricultural equipment having
   a. a tractor for moving in a direction of draft with
   b. rear wheels and
   c. front wheels,
   d. a tractor frame connecting the front wheels to the rear wheels,
   e. large low pressure pneumatic tires on the rear wheels,
   f. rear axles carrying said rear wheels extending from
   g. an axle housing extending on each side of
   h. a differential housing,
   j. a standard three point rear hitch attached to the differential housing including
      i. two lower draft links,
      ii. a top link, and
      iii. lift arms connected from the tractor to the lower draft links;
   k. a quick hitch yoke attached to the three point hitch, and
   l. an agricultural tillage implement attached to the quick hitch yoke;

Wherein the improvement comprises:
   m. stabilizer draw arms pivoted to the axle housings by
   n. horizontal bolts so as to prevent lateral movement of the stabilizer arms,
   o. frame draft arms pivoted to said stabilizer arms and attached to said tractor frame forward of the rear axles,
   p. a cross brace connecting the stabilizer arms at their rear, and
   q. connection means between said stabilizer draft arms and quick hitch yoke for
      i. stabilizing the agricultural implement from the stabilizer draw arms,
      ii. raising and lowering the stabilizer arms by the lift arms, and
      iii. preventing lateral movement of the implement relative to the stabilizer arms.

2. The invention as defined in claim 1 further comprising:
   r. each of said frame draft arms having a forward end when it is attached to the frame which is at least as high as the rear end where it is pivoted to the stabilizer arm.

3. The invention as defined in claim 1 wherein said connection means includes
   r. chain links connected in
   s. bushings on the stabilizer arms.

4. The invention as defined in claim 3 further comprising:
   t. the chain links connected in by bushing to the yoke coaxial with the connection of the draft link to the yoke, and
   u. said chain links extending downward from the yoke.

5. The invention as defined in claim 4 further comprising:
   v. the cross brace connecting the stabilizer arms at adjacent the links.

6. The invention as defined in claim 5 further comprising:
   w. each of said frame draft arms having a forward end when it is attached to the frame which is at least as high as the rear end where it is pivoted to the stabilizer arm.

* * * * *